United States Patent
Tien et al.

(10) Patent No.: US 8,543,327 B2
(45) Date of Patent: Sep. 24, 2013

(54) INTELLIGENT NAVIGATION DEVICE AND METHOD

(75) Inventors: Kai-Wen Tien, Tainan (TW); Jie-Min Chen, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 1355 days.

(21) Appl. No.: 12/149,651

(22) Filed: May 6, 2008

(65) Prior Publication Data

US 2009/0157301 A1 Jun. 18, 2009

(30) Foreign Application Priority Data

Dec. 14, 2007 (TW) .............................. 96147821 A (51) Int. Cl.
*G01C 21/30* (2006.01)
*G01C 21/32* (2006.01)
*G01C 21/00* (2006.01)

(52) U.S. Cl.
USPC ............................ 701/408; 701/468; 701/529

(58) Field of Classification Search
None
See application file for complete search history.

(56) References Cited

U.S. PATENT DOCUMENTS

| 5,632,008 A * | 5/1997 | Yokoyama .................... 345/442 |
| 5,671,395 A * | 9/1997 | Akiyama ........................ 716/55 |
| 6,542,808 B2 * | 4/2003 | Mintz ............................ 701/117 |
| 2010/0010735 A1 * | 1/2010 | Inoguchi et al. ............. 701/204 |

* cited by examiner

*Primary Examiner* — Paul Danneman
(74) *Attorney, Agent, or Firm* — McClure, Qualey & Rodack, LLP (57) ABSTRACT

The invention discloses an intelligent navigation method comprising the following steps of: (a) defining a system circle based on a current position and a target position; (b) searching a plurality of paths between the current position and the target position from the system circle; (c) for each path, calculating a total of directional paths and a total of path-influenced factors; (d) summing up the total of directional paths and the total of path-influenced factors for each path to obtain a plurality of summations; and (e) selecting a path corresponding to the minimum of all summations to be the optimal path.

5 Claims, 14 Drawing Sheets

INTELLIGENT NAVIGATION DEVICE AND METHOD

BACKGROUND OF THE INVENTION

1. Field of the Invention

The invention relates to a navigation method and, more particularly, to an intelligent navigation method for calculating a driving time after estimating an optimal path or for calculating an optimal path after estimating a driving time.

2. Description of the Prior Art

With the advance of technology, the applications of Global Positioning System (GPS) are getting more and more popular. In the present day, there are more and more people setting up the GPS on their vehicles for guiding the path.

In general, in order to search the optimal path, the guiding system of automobile electronics refers to the GPS with the map and the minimum distance between the user's current position and the target position. However, the conventional guiding system does not consider the factors comprising of a vehicle flow rate, the traffic and so on, and frequently causes the users to consume much more driving time.

Accordingly, a main scope of the invention is to provide an intelligent navigation method to solve the aforementioned problems.

SUMMARY OF THE INVENTION

A scope of the invention is to provide an intelligent navigation method. After estimating an optimal path, the method calculates a driving time.

According to an embodiment of the invention, the intelligent navigation method comprises the following steps of: (a) defining a system circle based on a current position and a target position; (b) searching a plurality of paths between the current position and the target position in the system circle; (c) respectively calculating a total of directional paths and a total of path-influenced factors for each path; (d) summing up the total of directional paths and the total of path-influenced factors respectively corresponding to each path so as to obtain a plurality of summaries; and (e) selecting one path corresponding to a minimum of all summaries as an optimal path. Then, the method, according to the optimal path, calculates a driving time correspondingly.

Another scope of the invention is to provide an intelligent navigation method. After estimating a driving time, the method calculates an optimal path.

According to an embodiment of the invention, the intelligent navigation method comprises the following steps of: (a) defining a system circle based on a current position and a target position; (b) searching a plurality of paths between the current position and the target position in the system circle; (c) dividing each path into a plurality of sections; (d) respectively calculating an estimative time for each section; (e) according to the estimative time, calculating a driving time corresponding to each path; and (f) selecting one path corresponding to a minimum of the driving time to be the optimal path.

Therefore, the intelligent navigation method according to the invention comprises two characteristics of: (1) in consideration of the path-influenced factor corresponding to each path, estimating the optimal path first, then calculating the driving time; (2) directly estimating the driving time, and then calculating the optimal time. Additionally, when the invention is performing the estimation, the original planed path can be immediately modified in the driving, so as to achieve the optimal path-planning.

The advantage and spirit of the invention may be understood by the following recitations together with the appended drawings.

DETAILED DESCRIPTION OF THE INVENTION

First of all, in order to achieve aforementioned scopes of the invention, the technical methods are explained as follows.

Set Up a System Circle

Figure 1:
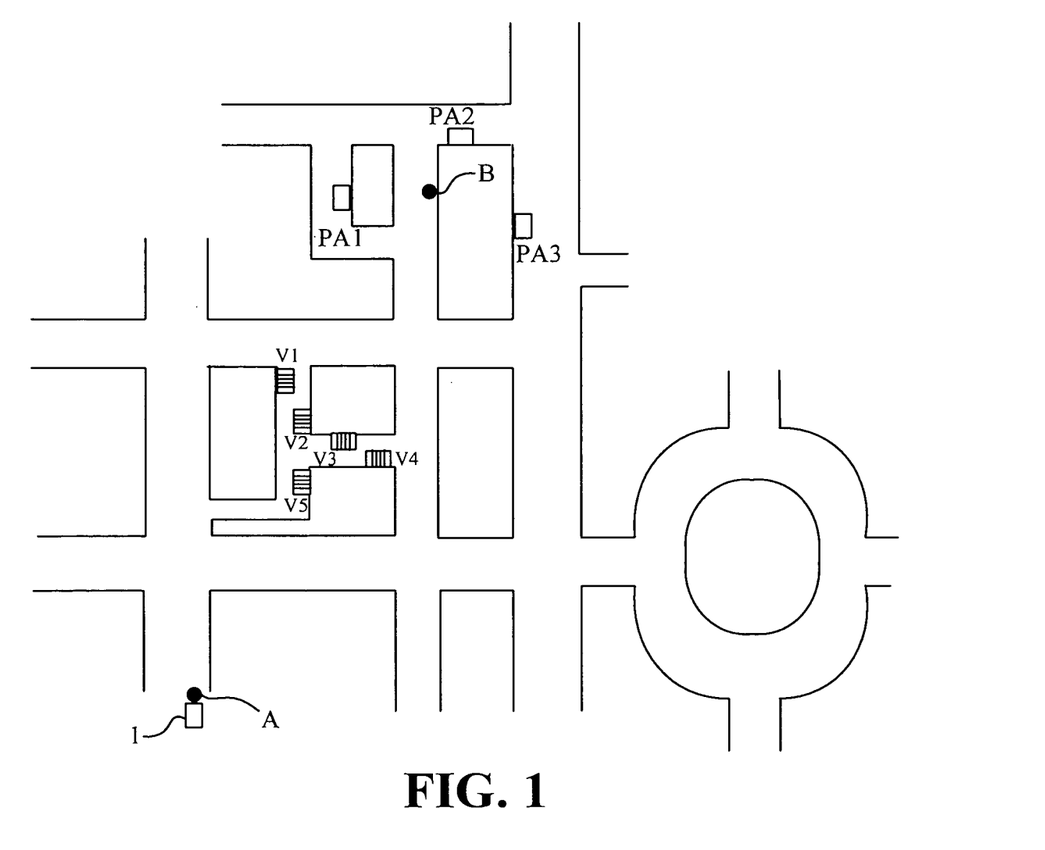
FIG. 1 shows a schematic diagram of a map for illustrating the invention.

Please refer to FIG. 1. FIG. 1 is a schematic diagram illustrating a map of the invention. As showed in FIG. 1. A is the current position of the user's vehicle 1, and B is the destination of the target position which the user wants to arrive in. V1 through VS shows other vehicles. PA1 through PA3 shows the space in which a vehicle can be parked. The invention determines a mode and method by considering a lot of factors, so as to more accurately appraise and calculate a path and time between A and B. On the premise that the path and time are calculated and appraised accurately and effectively, and in order to save both the operation resource and time, the invention provides a mode of system circle for estimating and calculating, and the invention is defined as the following two ways.

Figure 2:
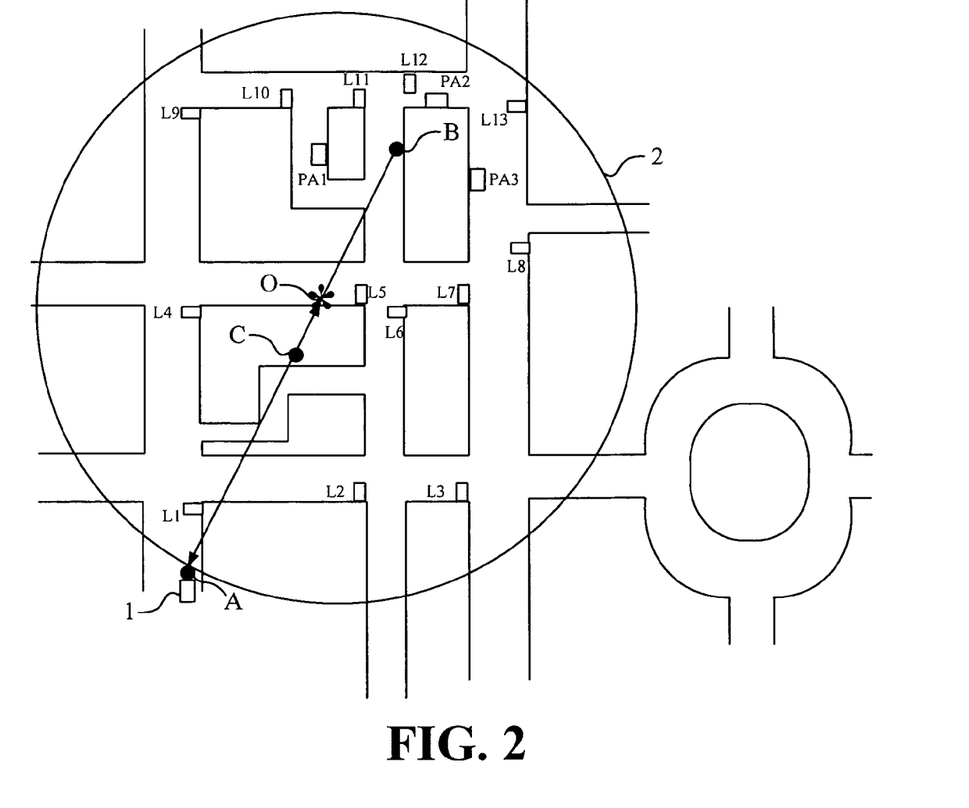
FIG. 2 illustrates a schematic diagram for defining a system circle according to an embodiment of the invention
Figure 3:
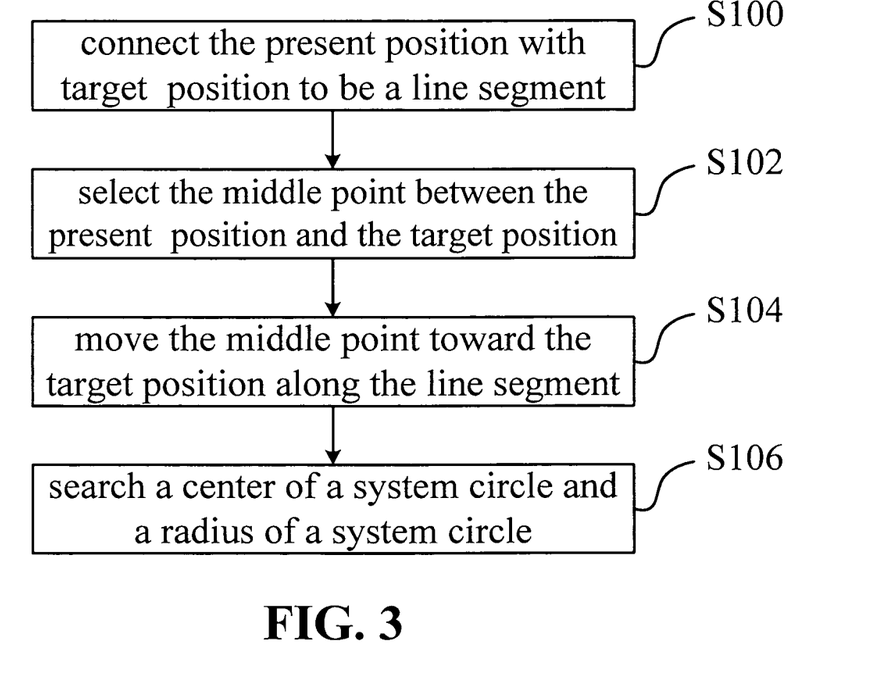
FIG. 3 is a flow chart showing a method for defining the system circle in FIG. 2.

Please refer to FIG. 2 through FIG. 3. FIG. 2 is a schematic diagram illustrating how to define a system circle 2 according to an embodiment of the invention. FIG. 3 is a flow chart showing a method for defining the system circle 2 in FIG. 2. L1 through L13 shows the traffic signal for each intersection in FIG. 2. PA1 through PA3 shows the space in which a vehicle can be parked in FIG. 2. First of all, step S100 is performed to connect the current position A and the target position B to be a line segment $\overline{AB}$. Further, step S102 is performed to select the middle point C between the current position A and the target position B. And further, step S104 is performed to move the middle point C toward the target position B along the line segment $\overline{AB}$. Taking the middle point C as a center of a circle and $\overline{AC}$ as a radius of the circle, and once the circle can cover at least one street around the target position B, step S106 is performed to assume that the point O is a center of the system circle 2 and $\overline{AO}$ is a radius of the system circle 2. As a result, the system circle 2 can be defined as showed in FIG. 2.

Figure 4:
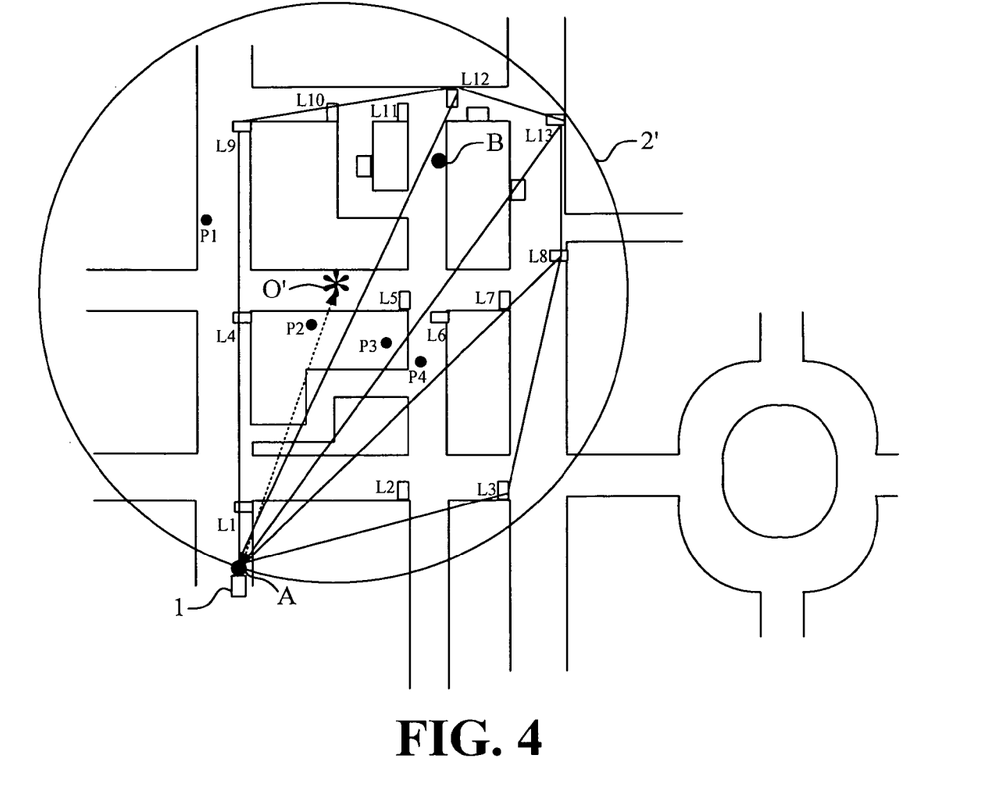
FIG. 4 is a schematic diagram illustrating how to define a system circle according to another embodiment of the invention.
Figure 5:
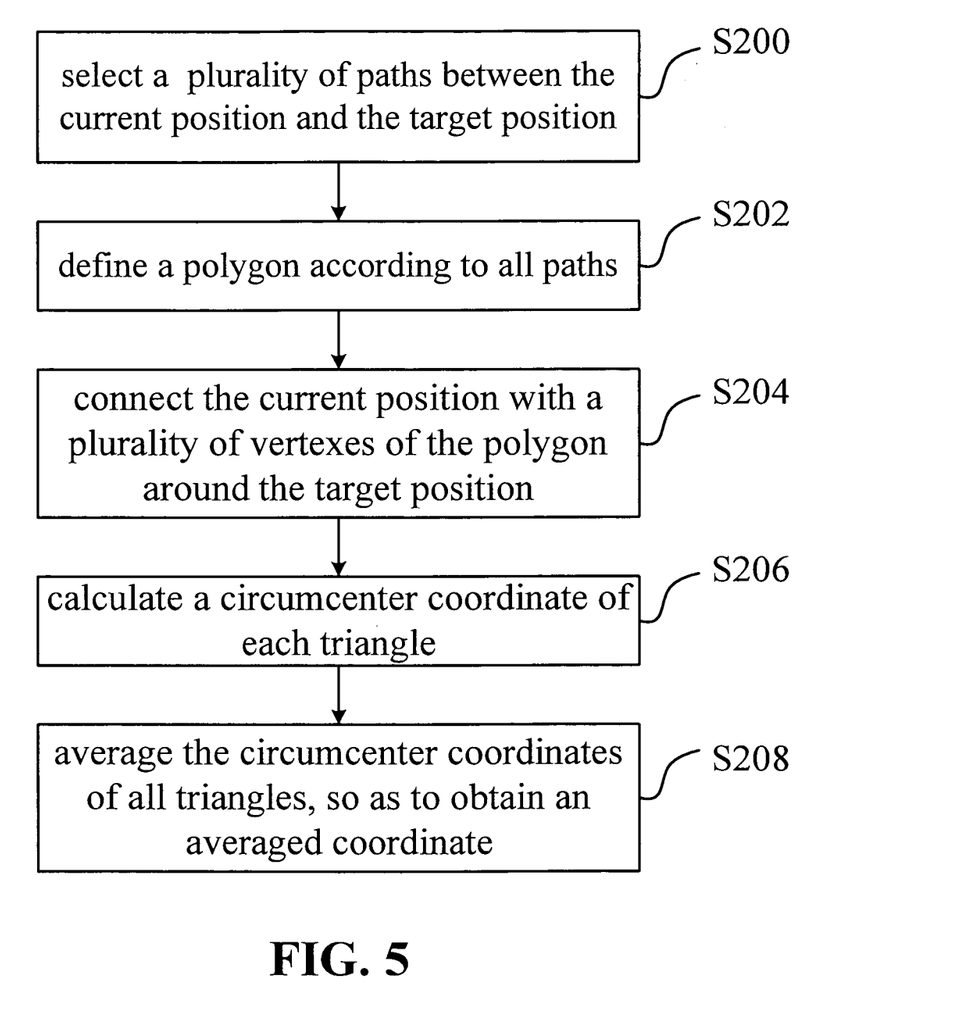
FIG. 5 is a flow chart showing a method for defining the system circle in FIG. 4.

Please refer to FIG. 4 through FIG. 5. FIG. 4 shows a schematic diagram illustrating how to define the system circle 2' according to another embodiment of the invention. FIG. 5 is a flow chart showing a method for defining the system circle 2' in FIG. 4. L1 through L13 shows the traffic signal for each intersection in FIG. 4; the traffic signals are such as traffic lights or a red flashlight in level crossing, and so on. First of all, step S200 is performed to select a plurality of paths between the current position A and the target position B, wherein the traffic signals in each one of the plurality of paths do not repeat themselves. For example, path 1: L1→L4→L9→L10→L11; path 2: L1→L4→L5; path 3: L1→L2→L6; path 4: L1→L2→L3→L8→L13→L12. Further, step S202 is performed to define a polygon based on all paths, wherein the vertexes of polygon are L9, L12, L8, and L3. Still further, step S204 is performed to connect the current position A and the plurality of vertexes of the polygon around the target position B (such as L12, L13, and L8 in FIG. 4), so as to obtain a plurality of triangles. Then, step S206 is performed to calculate a circumcenter coordinate of each triangle (the points such as P1, P2, P3, and P4 in FIG. 4)). Finally, S208 is performed to average the circumcenter coordinates of all triangles, so as to obtain an averaged coordinate to be a center O' of system circle 2', and take a line segment $\overline{AO'}$ between the averaged coordinate and the current position A as a radius of the system circle 2'. Thereby, the system circle 2' can be defined as showed in FIG. 4.

Figure 6:
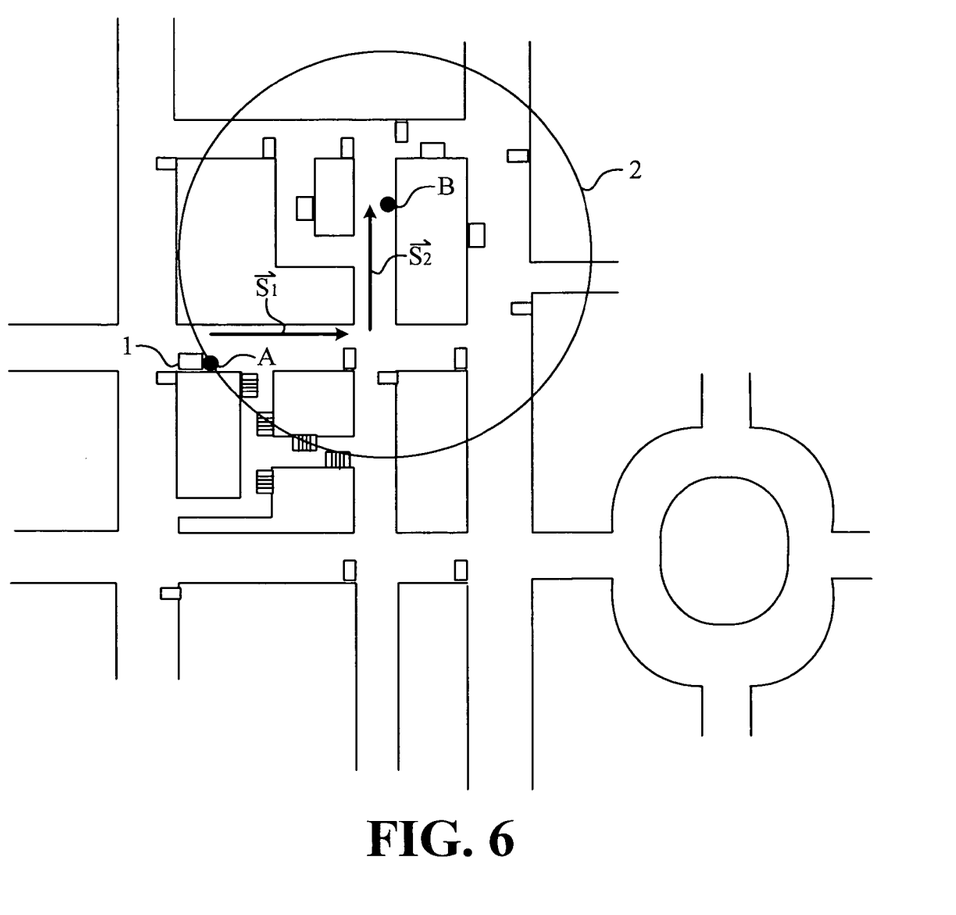
FIG. 6 is a schematic diagram illustrating a variation of the system circle after the user's vehicle moves away.

Please refer to FIG. 6. FIG. 6 is a schematic diagram illustrating a variation of the system circle 2 based on the movement of the user's vehicle 1. As showed in FIG. 6, when the current position A is close to the target position B, the system circle 2 is getting smaller.

Node Analysis

Figure 7:
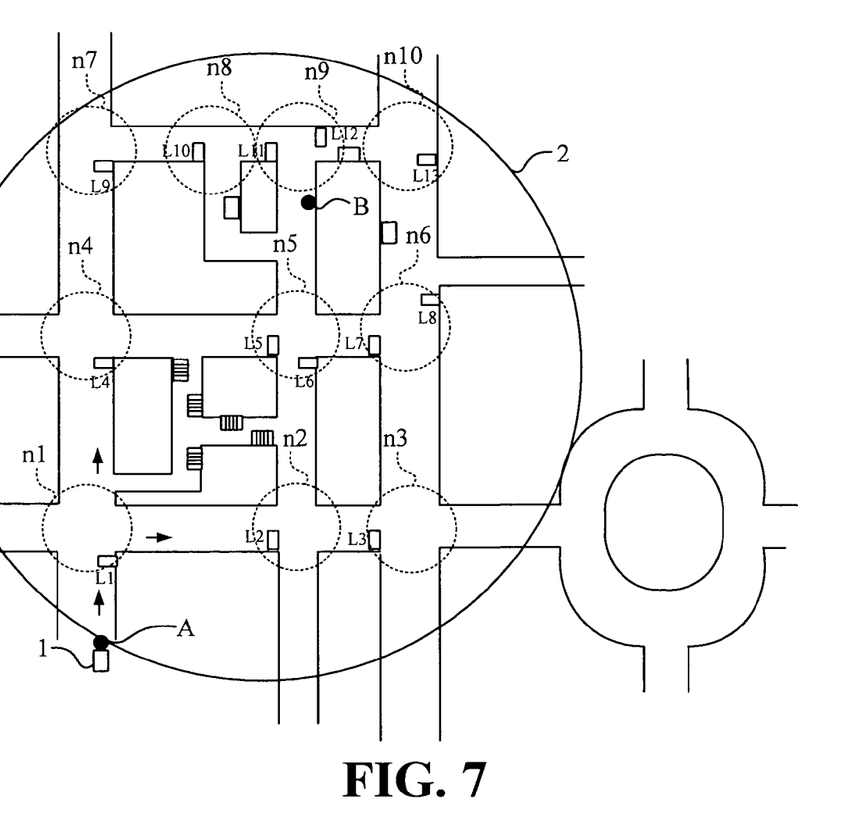
FIG. 7 is a schematic diagram illustrating a node in the system circle.

Please refer to FIG. 7. FIG. 7 is a schematic diagram illustrating the nodes n1 through n10 in system circle 2. The node is selected from an intersection with traffic signals. An arrow in FIG. 7 represents a direction of vehicle flow rate. The vehicle flow rate of the node is analyzed as follows, wherein the unit is expressed as "unit vehicle per unit time".

(1) The traffic signal at the intersection sets up a wireless reader similar to Electronic Toll Collection (ETC), such as an optical (i.e. infrared rays) or radio frequency (RF) communication module, and so on. The same standard communication system is provided in the vehicle. After calculating the unit vehicle per unit time, the reader of the traffic signal which arranges the counter in pairs transmits a signal to the user's vehicle by the following ways. (a) After selecting a traffic signal in the path, the user's vehicle transmits a signal to the server for integrating the data information via network. Further, the integrated data information is transmitted to the user's vehicle via a wireless network. The integrated data information means the vehicle flow rate of the node in the path selected by the user's vehicle. (b) The traffic signal in the path is selected by user's vehicle, according to the known Mesh Network way, transmitting to the nearby user's vehicles via certain traffic signals.

(2) A vehicle can be located by the GPS or the base station of cell phone. The communication system is necessary in the vehicle. If a vehicle is located by GPS, the vehicle transmits a signal with the current position of the vehicle back to the server via the wireless network. Thereby, after integrating the data information, the server transmits the data information back to the user's vehicle. If a vehicle is located by the base station system of cell phone, after integrating the located information, the Visitor Location Register (VLR) of the base station system transmits the located information to the user's vehicle. Then the user's vehicle, according to the located information, calculates the vehicle flow rate of the node in the chosen path.

Define a Path-Influenced Factor

Figure 8:
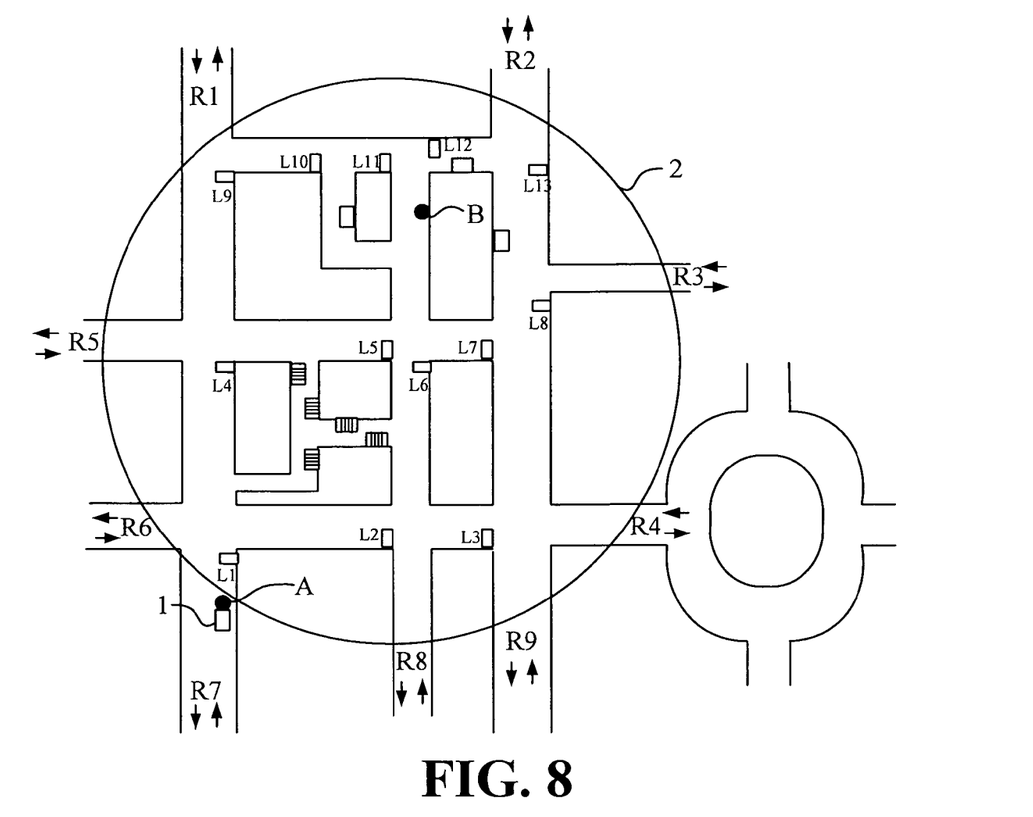
FIG. 8 is a schematic diagram illustrating a road in the peripheral of the system circle.

Please refer to FIG. 8. FIG. 8 is a schematic diagram illustrating peripheral roads R1 through R9 in the system circle 2. In order to estimate whether the vehicle flow rate and the traffic signal influence the driving path of user's vehicle, the invention defines a path-influenced factor $\Delta \overset{\omega}{A'}$, as shown in following Formula I.

$$\Delta \overset{\omega}{A'} = \left( \frac{\overset{\omega}{M}}{t} \overline{C} + \frac{\overset{\omega}{M'}}{t} \overline{C'} P \right) \Delta t_s + \frac{\overset{\omega}{M}}{t} \overline{C} \Delta t_f \qquad \text{Formula 1}$$

In Formula 1, $$\frac{\overset{\omega}{M}}{t}$$

means the vehicle flow rate in a section, and the section is defined as the following parts; $\overline{C}$ represents the averaged length of vehicles in the section;

$$\frac{\overset{\omega}{M'}}{t}$$

represents the vehicle flow rate in each of the peripheral roads R1 through R9; $\overline{C'}$ represents the averaged length of vehicles in each of the peripheral roads R1 through R9; $\Delta t_s$ represents the time that the length of the road is divided by the averaged vehicle speed in the section; $\Delta t_f$ represents the time between the unallowable and allowable passing time controlled by a traffic signal in the section; P represents the probability of a vehicle driving to a certain section in each of the peripheral roads R1 through R9. The probability P can be determined by (1) the equal chance or (2) the information-shared. The equal chance refers to that the probability is 50% respectively if there are two roads ahead. The information-shared means that the destination where each vehicle wants to arrive in is shared in advance, thus, the probability P is either 100% or 0% depending on whether the vehicle would pass the section or not.

Section Analysis

The section analysis is to analyze for a certain section with "estimating the road mode in section". The section is divided into two parts as follows: (1) the user's section; (2) other sections in the system circle.

Estimate the Road Mode in Section

Figure 9:
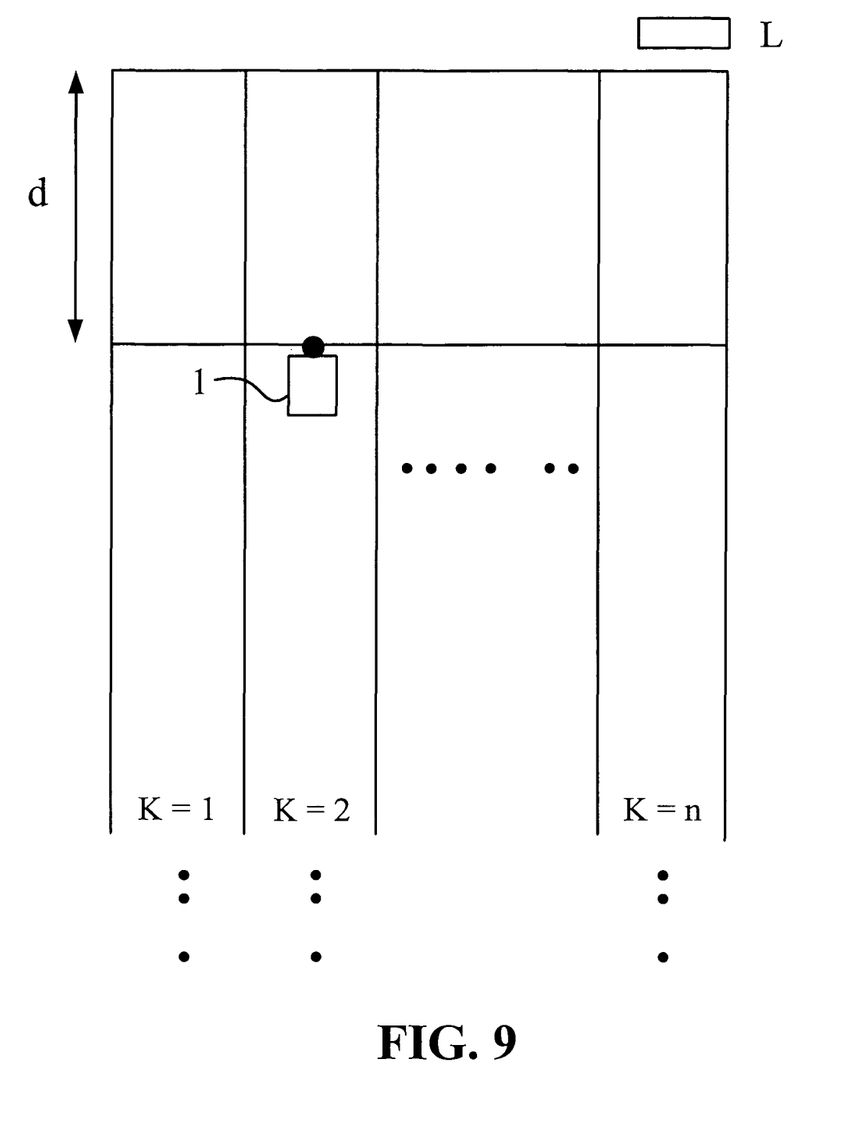
FIG. 9 is a schematic diagram illustrating for estimating a road mode in a section.

Please refer to FIG. 9. FIG. 9 is a schematic diagram illustrating for estimating the road mode in section. As shown in FIG. 8, in the condition of section analysis (1) d is the distance between the use's vehicle 1 and the traffic signal ahead L. K is an amount of the lanes in the section. In FIG. 8, the user's vehicle 1 is in the second lane (K=2). The value of d may be obtained from the aforementioned GPS, the base station of cell phone for locating a vehicle, or one dimension single-point location in a straight, wherein the method of the single-point location can obtain the distance of vehicle in the section via the time of transmitting package information and the strength of the receiving signal. In actual applications, a corresponding location communication module is required in the vehicle and on the roadside. And the module can be set up in the traffic signal on the roadside.

Assume that W is an amount of vehicles in the region of d. W can be obtained from 1.) a camera system on the roadside, 2.) the aforementioned GPS or the base station of cell phone for locating a vehicle, and 3.) one dimension single-point location in a straight, so as to distinguish how many vehicles in the region of d. $\overline{C}$ represents the averaged length of vehicles in the flow rate. The averaged length can be simplified as the standard length of a general middle-sized vehicle. The invention further defines a comparison factor a (as shown in Formula. 2), for estimating the condition of occupying the empty in the lanes.

$$a = \frac{W}{K}\overline{C} \qquad \text{Formula 2}$$

Please note that if the condition of the section analysis is (2) (i.e. other sections in the system circle), the aforementioned value of d is the length of road in the section.

Estimate the Road Mode in Section

The invention can take the path influenced by dynamic information into consideration at the same time while estimating the path. The scope of the dynamic information includes traffic accident, road construction, activities, and temporary parking in the alley, and so on, which causes parts or all of roads occupied. The generation of the dynamic information influences the path-estimation illustrated as follows. For example, if there is an accident in a certain section such as first lane (K=1), the accident causes the vehicle unable to pass through the first lane. After receiving the dynamic information, the estimative system subtracts 1 from K in the section and examines whether the section is part of the original optimal path or not; if yes, then re-estimate a new optimal path and inform the user the new optimal path.

The method for obtaining the dynamic information comprises: receiving the dynamic information by broadcasting via an automotive wireless communication system and the location system, or regularly inquiring the traffic controller center via the vehicle wireless communication system. After receiving the dynamic information, the invention changes the lanes in the section (such as the value of K) and estimates a new optimal path and driving time at once.

In additional, the effects caused by the dynamic information, not only can be recalculated to obtain the optimal path and driving time, but also can be stored and update the database the influence caused by the dynamic information. Furthermore, after the dynamic information occurs, the invention can rapidly calculate the new optimal path and driving time via comparing with the database.

Estimate the Time Via Distinguishing the Condition

Figure 10:
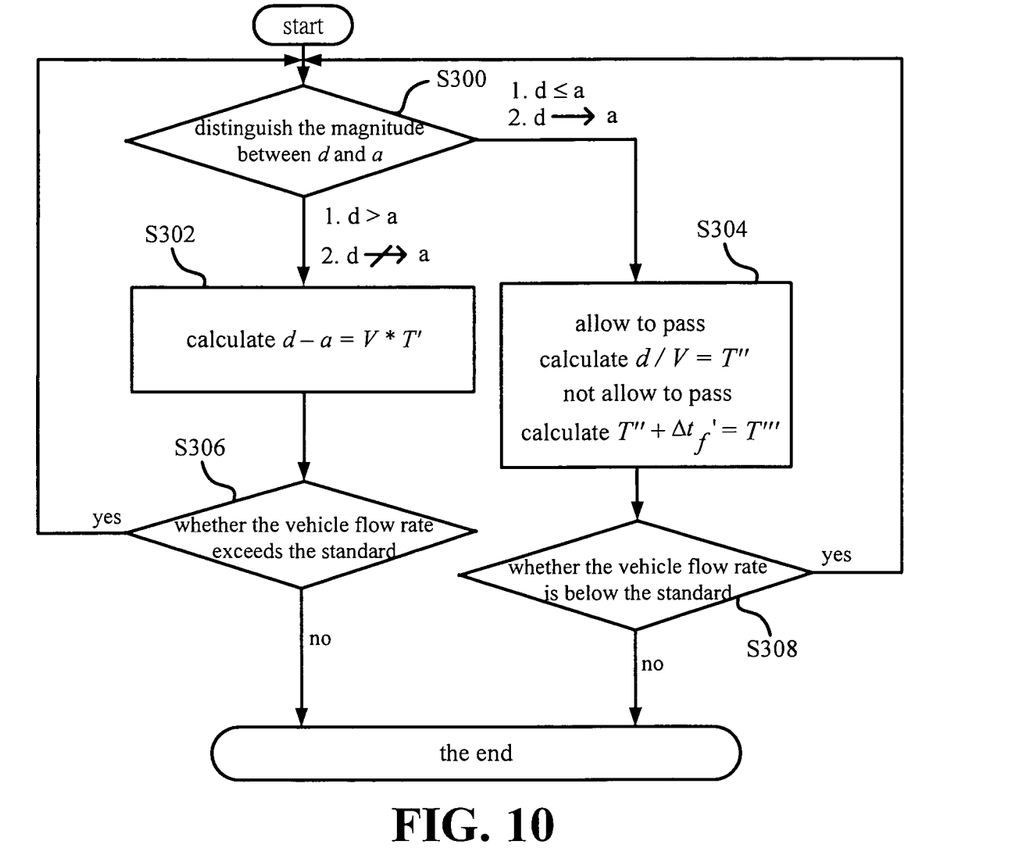
FIG. 10 is a flow chart showing a method for estimating time.

Please refer to FIG. 10. FIG. 10 is a flow chart showing a method for estimating time. Estimating the time by distinguishing the magnitude of d from a and the level of the vehicle flow rate. The condition is used for estimating the aforementioned (1) the user's section, and (2) the other section in the system circle; the steps comprise of:

First of all, step S300 is performed to distinguish d from a, if d>a, and d is not close to a, step S302 is performed; if d≦a, or d is close to a, S304 is performed.

Step S302 is performed to calculate a first estimative time T' according to d−a=V×T', wherein V represents the averaged speed of the user's vehicles in the section. After this, step S306 is performed to distinguish whether the vehicle flow rate exceeds to the standard; namely, consider whether d≦a, or d is close to a. If yes, then jump to perform step S300; if no, then the step is complete.

In step S304, if the traffic signal ahead allows the vehicles to pass through, then according to $$\frac{d}{V} = T'',$$

calculate the second estimative time T". If the traffic signal ahead does not allow the vehicles to pass through, then according to T"+$\Delta t_f'$=T''', calculate the third estimative time T''', wherein $\Delta t_f'$ represents the time between the unallowable and allowable passing controlled by a traffic light. After this, step S308 is performed to distinguish whether the vehicle flow rate is less than the standard; namely, consider whether the probability of d>a, and d is not close to a. If yes, then jump to step S300; if no, then the step is complete.

It should be noted that the method is used for determining a vehicle allowable or unallowable passing through controlled by the traffic signal as follows.

Condition 1: when a traffic signal allows a vehicle to pass through, the traffic signal compares a time T" of the vehicle arriving to the traffic signal with a time T1 of the vehicle between allowable and unallowable passing through controlled by the traffic signal; if T"<T1, then the vehicle is passing allowable; if T">T1, then the vehicle is passing unallowable.

Condition 2: when a traffic signal does not allow a vehicle to pass through, the traffic signal compares a time T" of the vehicle arriving to the traffic signal with a time T2 of the vehicle between unallowable and allowable passing through controlled by the traffic signal; if T"<T2, then the vehicle is passing unallowable; if T">T2, then the vehicle is passing allowable.

Estimating an Optimal Path, then Calculating a Driving Time

Figure 11:
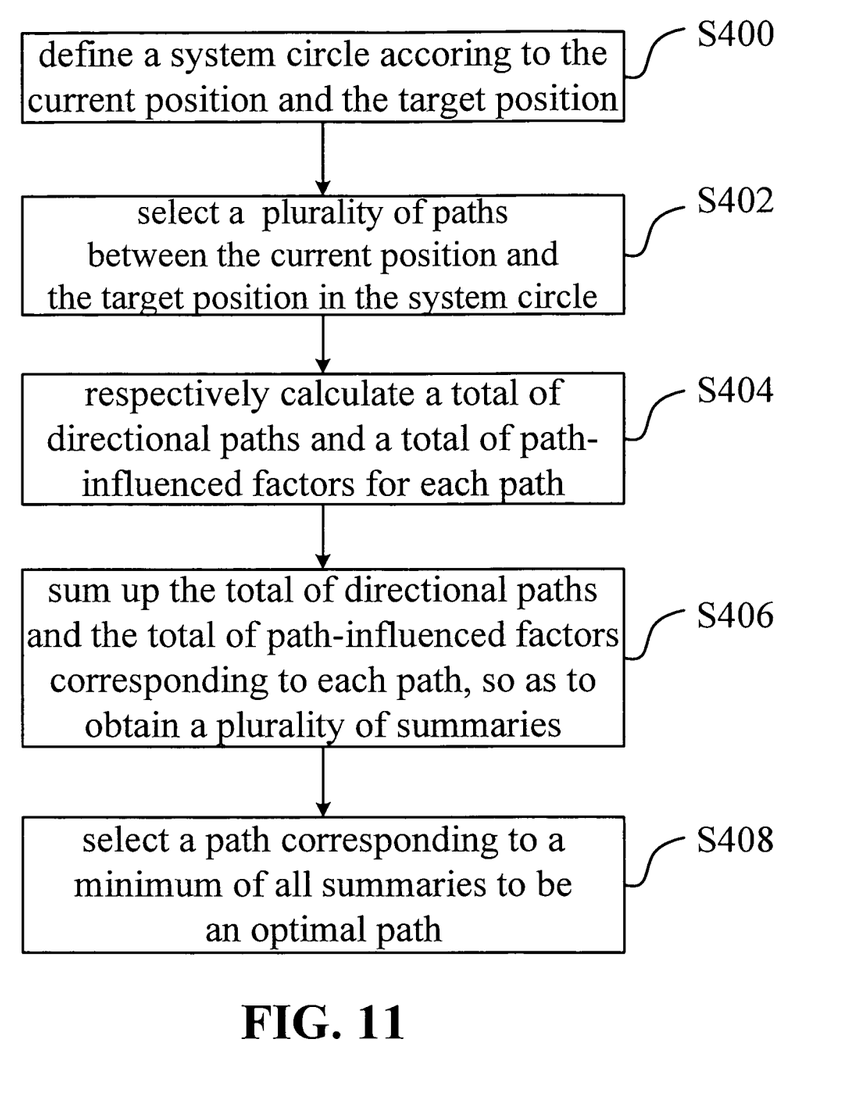
FIG. 11 is a flow chart showing a method for estimating an optimal path, then for calculating a driving time.

Please refer to FIG. 11. FIG. 11 is a flow chart showing a method for estimating an optimal path first, and then calculating a driving time. First of all, step S400 is performed, according to a current position and a target position, to define a system circle. Further, step S404 is performed respectively to calculate a total of directional path and a total of path-influenced factors for each path. Furthermore, step S406 is performed to sum up the total of directional paths and the total of path-influenced factors corresponding to each path, so as to obtain a plurality of summaries corresponding to each path. Finally, S408 is performed to select a path corresponding to the minimum of all summaries to be the optimal path.

In step S404, for each of all paths, the total of directional paths can be calculated by the following steps: dividing the path into a plurality of sections, respectively calculating a directional path for each section, and summing up all directional paths so as to obtain the total of directional paths. For example, there are two directional paths $\vec{S}_1$ and $\vec{S}_2$ in FIG. 6, and the total of directional paths $\vec{S} = \vec{S}_1 + \vec{S}_2$.

In step S404, the total of path-influenced factors can be calculated by the following steps: according to a system circle, obtaining a plurality of peripheral roads, respectively calculating a path-influenced factor for each peripheral road, and summing up all path-influenced factors, so as to obtain the total of path-influenced factors.

After determining the optimal path, the driving time can be calculated according to the flow chart in FIG. 10.

It is necessary to explain that since the system circle, path-influenced factors, and so on, have been already described, and they are not explained again hereon.

Estimating a Driving Time, then Calculating an Optimal Path

Figure 12:
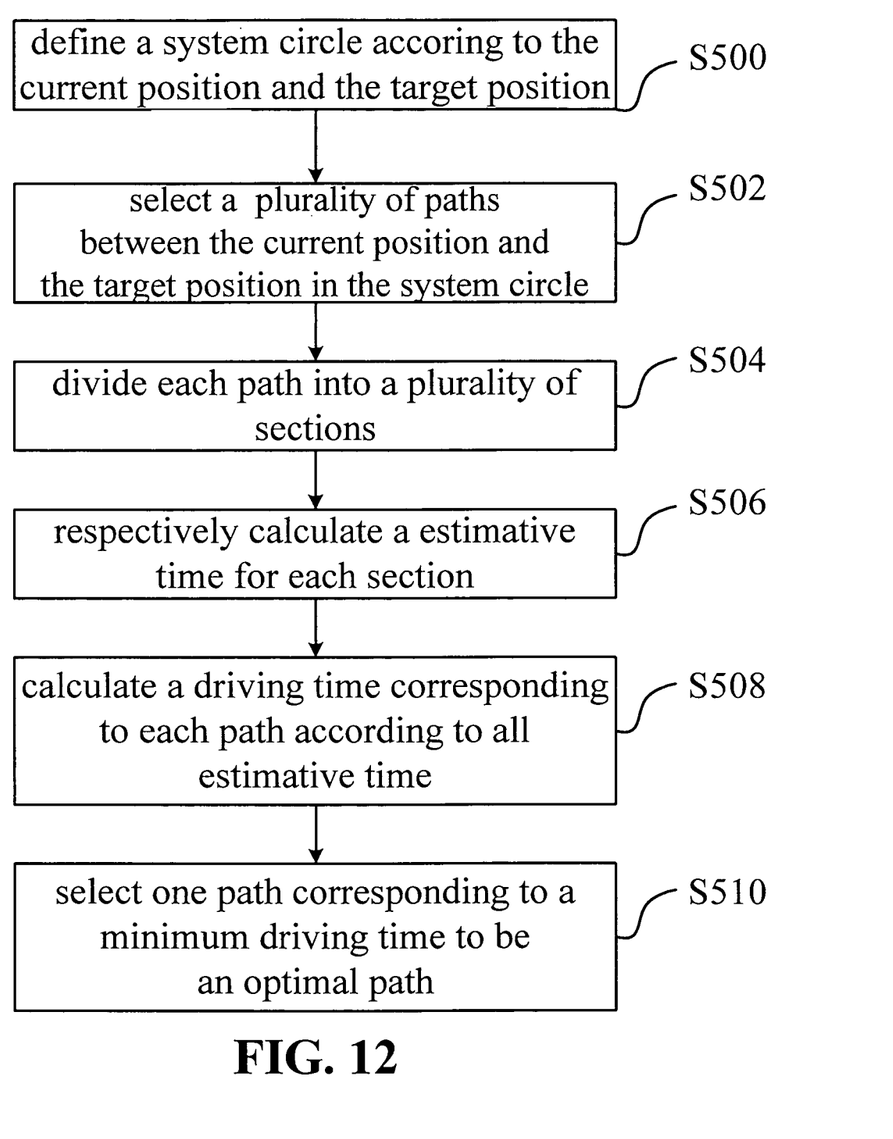
FIG. 12 is a flow chart showing a method for estimating a driving time, then for calculating an optimal path.

Please refer to FIG. 12. FIG. 12 is a flow chart showing a method for estimating a driving time, so as to calculate an optimal path. First of all, step S500 is performed, according to the current position and the target position, to define the system circle. Then, step S502 is performed to search a plurality of paths between the current position and the target position in the system circle. Next, S504 is performed to divide each path into a plurality of sections. After that, S506 is performed respectively to calculate an estimative time for each section. Further, S508 is performed, according to all estimative time, to calculate the driving time corresponding to each path. Finally, step S510 is performed to select a path corresponding to a minimum of the driving time as the optimal path.

It is necessary to explain that the theorem of system circle has been described above; therefore, it is not explained again hereon.

Figure 13:
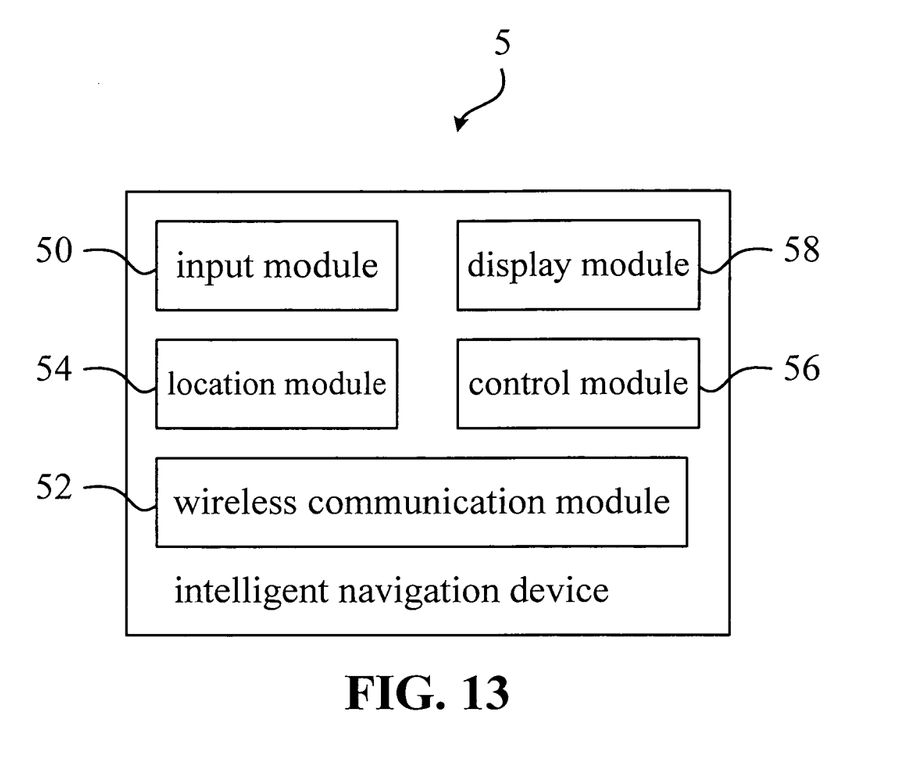
FIG. 13 is a functional block diagram illustrating an intelligent navigation device according to an embodiment of the invention.

Please refer to FIG. 13. FIG. 13 is a functional block diagram illustrating an intelligent navigation device 5 according to an embodiment of the invention. The intelligent navigation device 5 comprises an input module 50, a wireless communication module 52, a position module 54, a control module 56, and a display module 58.

The input module 50 is provided for users to input the target position as described above. The input method can be a voice input, keying input, or controller-touched panel input. The wireless communication 52 is provided to receive the information of vehicle flow rate as described above. The location module 54 is provided to determine the current position as describe above. The location module can be a known GPS module. The control module 56 is provided to perform the above mentioned steps for processing or calculating, which is not explained again herein. The display module 58 is provided to show the optimal path generated by the control module 56. The display module 58 can be liquid crystal display (LCD) panels or other display components.

Figure 14:
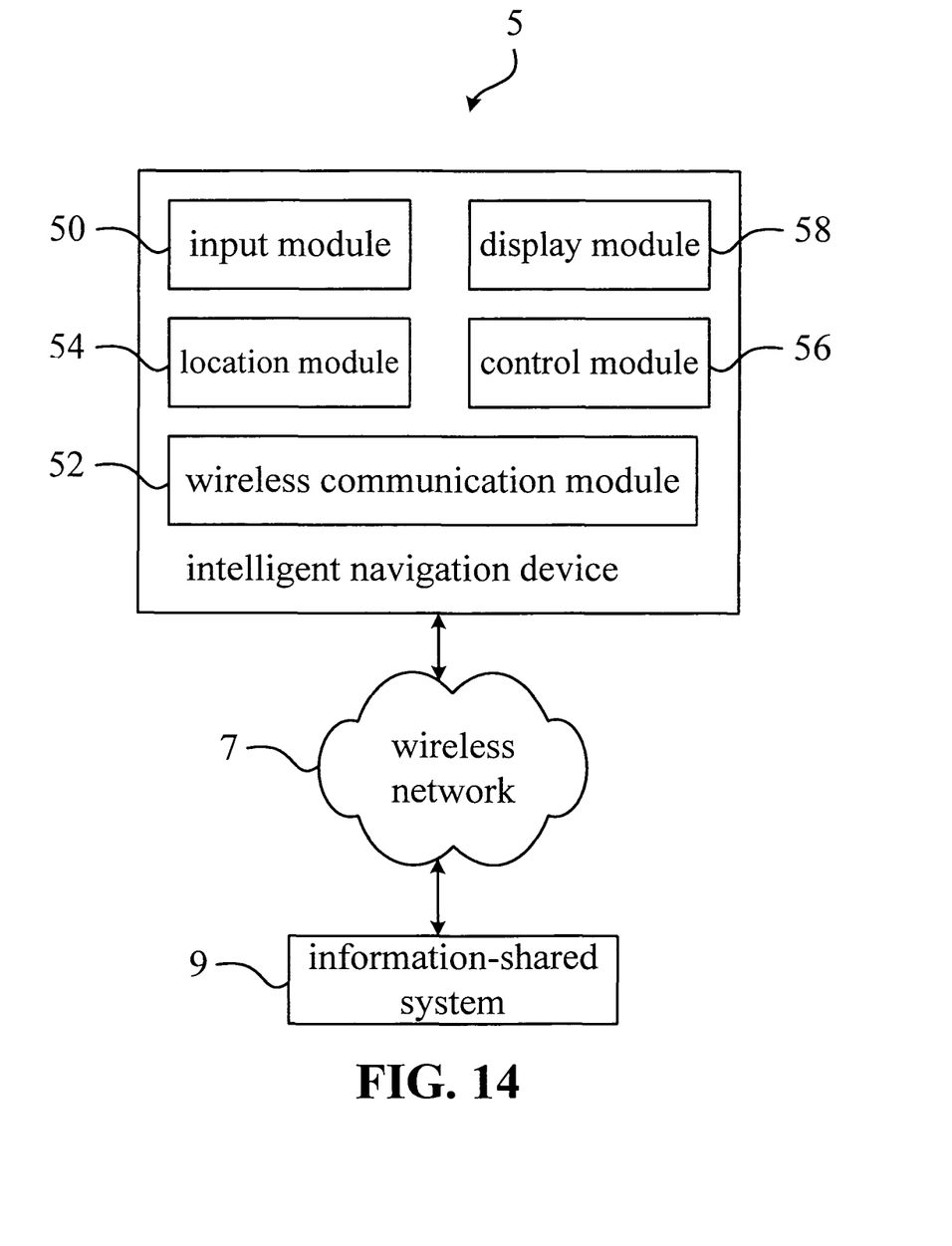
FIG. 14 is a functional block diagram illustrating an intelligent navigation device which communicates with an information-shared system via a wireless communication network in FIG. 13.

In additional, the intelligent navigation device 5 can communicate with an information-shared system 9 via a wireless communication network 7, as shown in FIG. 14. The information-shared system 9 can provide the vehicle flow rate for the intelligent navigation device 5. The information-shared system 9 can comprise a plurality of traffic signals and/or vehicles. In the invention, the traffic signal and vehicles transmit the information to each other via network, without another server. After the intelligent navigation device 5 of the invention receives the information, the control module 56 calculates the steps correspondingly. Therefore, the invention is not in need of maintaining the server.

Compared with prior arts, the intelligent navigation method according to the invention comprises two characteristics as follows: (1) estimating the optimal path, so as to calculate the driving time; (2) estimating the driving time, and then calculating the optimal path. Additionally, when the invention is performing the estimation, the path-influenced factors corresponding to each path are considered. Therefore, the original planed path can be immediately modified, so as to make the path-planed to achieve the optimization.

With the example and explanations above, the features and spirits of the invention will be hopefully well described. Those skilled in the art will readily observe that numerous modifications and alterations of the device may be made while retaining the teaching of the invention. Accordingly, the above disclosure should be should be construed as limited only by the metes and bounds of the appended claims.

What is claimed is:

1. An intelligent navigation method used in a vehicle, which comprises an input module, a wireless communication module, a position module, a control module and a display module, the intelligent navigation method comprising steps of:
   (a) defining a system circle according to a current position determined by the position module and a target position inputted through the input module by the control module;
   (b) searching a plurality of paths between the current position determined by the position module and the target position inputted through the input module from the system circle by the control module;
   (c) calculating a total of directional paths and a total of path-influenced factors for each path by the control module, wherein in step (c), the total of path-influenced factors is calculated by steps of:
      obtaining a plurality of peripheral roads according to the system circle; and
      respectively calculating a path-influenced factor for each peripheral road, and summing up the path-influenced factors to obtain the total of path-influenced factors, wherein the path-influenced factor is calculated by following formula:

$$\Delta \vec{A}' = \left( \frac{\vec{M}}{t} \vec{C} + \frac{\vec{M}'}{t} \vec{C}' P \right) \Delta t_s + \frac{\vec{M}}{t} \vec{C} \Delta t_f$$

wherein $$\frac{\vec{M}}{t}$$

represents a vehicle flow rate received by the wireless communication module per unit time in one section of the current position; $\vec{C}$ represents an averaged vehicle length in the section of the current position;

$$\frac{\vec{M}'}{t}$$

represents a vehicle flow received by the wireless communication module rate per unit time in the peripheral road; $\vec{C}'$ represents an averaged vehicle length in the peripheral road; $\Delta t_s$ represents a time obtained by dividing a path length by an averaged vehicle speed in the section of the current position; $\Delta t_f$ represents a time between unallowable and allowable passing controlled by a traffic light in the section of the current position; P represents a probability that one vehicle drives to a certain section in the peripheral road;
   (d) summing up the total of directional paths and the total of path-influenced factors for each path to obtain a plurality of summations; and
   (e) selecting one path corresponding to a minimum of all summations as an optimal path determined by the control module according to the current position and the target position, wherein the optimal path is displayed by the display module.

2. The method of claim 1, wherein the system circle is defined by steps of:
   connecting the current position with the target position to be a first line segment;
   selecting a middle point between the current position and the target position;

moving the middle point toward the target position along the first line segment; and taking the middle point as a center of a circle, taking a second line segment between the current position and the middle point as a radius of the circle, and once the circle covers at least one street around the target position, assuming that the middle point is a center of the system circle, and the second line segment is a radius of the system circle.

3. The method of claim 1, wherein the system circle is defined by steps of:

selecting a plurality of paths between the current position and the target position;

defining a polygon according to the paths;

connecting the current position with a plurality of vertexes of the polygon around the target position, so as to obtain a plurality of triangles;

calculating a circumcenter coordinate value of each triangle; and adding the circumcenter coordinate value of each triangle for obtaining a total value, and dividing the total value to a number of the circumcenter coordinates of the triangles to obtain an averaged coordinate as a center of the system circle, and a line segment between the averaged coordinate and the current position as a radius of the system circle.

4. The method of claim 1, wherein for one of the paths in step (c), the total of directional paths is calculated by steps of:

dividing the path into a plurality of sections; and respectively calculating a directional path for each section, and summing up the directional paths to obtain the total of directional paths.

5. The method of claim 1, further comprising steps of:

receiving a dynamic information; and examining whether the dynamic information influences the optimal path or not; if yes, re-estimating the optimal path.

* * * * *